US012616926B2

(12) United States Patent
Chen et al.

(10) Patent No.: US 12,616,926 B2
(45) Date of Patent: May 5, 2026

(54) CLEANING FRAME FOR WASTE GAS PURIFICATION APPARATUS

(71) Applicant: Illinois Tool Works Inc., Glenview, IL (US)

(72) Inventors: Yuexin Chen, Glenview, IL (US); Yuwei Wang, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 442 days.

(21) Appl. No.: 18/267,028

(22) PCT Filed: Dec. 16, 2021

(86) PCT No.: PCT/US2021/063853
§ 371 (c)(1),
(2) Date: Jun. 13, 2023

(87) PCT Pub. No.: WO2022/133115
PCT Pub. Date: Jun. 23, 2022

(65) Prior Publication Data
US 2024/0307807 A1 Sep. 19, 2024

(30) Foreign Application Priority Data
Dec. 18, 2020 (CN) .......................... 202011504972.6

(51) Int. Cl.
*B01D 41/04* (2006.01)
(52) U.S. Cl.
CPC .................................... *B01D 41/04* (2013.01)
(58) Field of Classification Search
CPC .............. B01D 41/04; B08B 3/08; B08B 3/12
(Continued)

(56) References Cited

U.S. PATENT DOCUMENTS

2005/0109376 A1 * 5/2005 Gregory ................ B08B 9/0936
134/198

FOREIGN PATENT DOCUMENTS

CN 204135752 U 2/2015
CN 205200046 U 5/2016
(Continued)

*Primary Examiner* — Hayden Brewster
(74) *Attorney, Agent, or Firm* — Lando & Anastasi, LLP

(57) ABSTRACT

The present application provides a cleaning frame, for keeping a waste gas purification apparatus (150) in a cleaning solution, the waste gas purification apparatus comprising an end plate (132) and a connecting component (131) located above the end plate, and the cleaning frame comprising a bottom (101) and a sidewall (103). The bottom is provided with a channel running through the bottom. The sidewall is formed by upward extension from the bottom around the channel; the sidewall and the bottom enclose a holding cavity. The cleaning frame is configured such that the waste gas purification apparatus can be kept floating in the cleaning solution by the cleaning frame, and the sidewall (103) of the cleaning frame can at least partially float above the surface of the cleaning solution, so as to isolate the connecting component of the waste gas purification apparatus from the cleaning solution. At the same time as enabling the cleaning of a filtration component (133) in the waste gas purification apparatus, the cleaning frame of the present application eliminates the operating step of manually removing the connecting component from the waste gas purification apparatus, so that the operating steps involved in cleaning the waste gas purification apparatus are simplified, and the time cost is low.

10 Claims, 7 Drawing Sheets

(58) Field of Classification Search
USPC ......................................................... 210/791
See application file for complete search history.

(56) References Cited

FOREIGN PATENT DOCUMENTS

| CN | 106076025 A | 11/2016 |
| CN | 106794406 A | 5/2017 |
| CN | 110465156 A | 11/2019 |
| JP | 2004177676 A | 6/2004 |
| KR | 20200054507 A | 5/2020 |
| TW | 202237255 A | 10/2022 |

* cited by examiner

CLEANING FRAME FOR WASTE GAS PURIFICATION APPARATUS

CROSS-REFERENCE TO RELATED APPLICATIONS

This application is a U.S. National Phase Application under 35 U.S.C. § 371 of International (PCT) Patent Application Serial No. PCT/US2021/063853, titled "CLEANING FRAME FOR WASTE GAS PURIFICATION APPARATUS" filed on Dec. 16, 2021, which claims priority to Chinese Application Serial No. 202011504972.6, titled "CLEANING FRAME" filed Dec. 18, 2020; the entire disclosure of each application is hereby incorporated herein by reference in its entirety for all purposes.

TECHNICAL FIELD

The present application relates to a cleaning frame, in particular to a cleaning frame for cleaning a waste gas purification apparatus of a reflow oven.

BACKGROUND ART

A reflow oven is a piece of equipment used in the manufacture of printed circuit boards. A reflow oven can heat up solder paste and thereby solder electronic components onto a circuit board. Solder paste contains solder and flux; when the solder paste is melted, the flux will change to a gas and be discharged from the reflow oven. In general, a waste gas purification apparatus is provided in the reflow oven. Flux-containing waste gas is discharged from the reflow oven via the waste gas purification apparatus. The waste gas purification apparatus can filter the flux-containing waste gas, such that the flux accumulates and becomes attached within the waste gas purification apparatus, so that the waste gas discharged from the waste gas purification apparatus contains no flux, thus avoiding environmental pollution.

However, it is difficult to clean the waste gas purification apparatus in which flux has accumulated and become attached.

SUMMARY OF THE INVENTION

The present application provides a cleaning frame, for keeping a waste gas purification apparatus in a cleaning solution, the waste gas purification apparatus comprising an end plate and a connecting component located above the end plate, and the cleaning frame comprising a bottom and a sidewall. The bottom is provided with a channel running through the bottom. The sidewall is formed by upward extension from the bottom around the channel, the bottom having a retaining part between the sidewall and the channel. The sidewall and the retaining part enclose a holding cavity. A dimension of the channel is smaller than a dimension of the end plate of the waste gas purification apparatus, so that the end plate of the waste gas purification apparatus can be set up on the retaining part and seal the channel, such that the connecting component is located above the retaining part, and located within the holding cavity. The cleaning frame is configured such that: the waste gas purification apparatus can be kept floating in the cleaning solution by the cleaning frame, and the sidewall of the cleaning frame can at least partially float above the surface of the cleaning solution, so as to isolate the connecting component of the waste gas purification apparatus from the cleaning solution.

In the cleaning frame according to the present application, the height of the sidewall is configured such that: when the end plate of the waste gas purification apparatus is set up on the bottom, the top of the sidewall is higher than the top of the waste gas purification apparatus.

The cleaning frame according to the present application comprises a counterweight, the counterweight being connected to the sidewall, in order to keep the waste gas purification apparatus on the surface of the cleaning solution in a balanced fashion.

In the cleaning frame according to the present application, the position of the counterweight is set according to the center of gravity of the waste gas purification apparatus.

In the cleaning frame according to the present application, the counterweight is connected to the sidewall by welding.

The cleaning frame according to the present application comprises multiple connecting means, the multiple connecting means being arranged on the cleaning frame, in order to connect the waste gas purification apparatus to the cleaning frame.

In the cleaning frame according to the present application, the multiple connecting means are arranged on the bottom, around the channel.

In the cleaning frame according to the present application, each of the multiple connecting means comprises a bolt, a clamping member and a nut. The bolt is connected to the bottom. The clamping member is provided with a bolt hole through which the bolt can pass, the clamping member being configured to abut the waste gas purification apparatus. The nut is able to mate with the bolt, so as to connect the waste gas purification apparatus to the cleaning frame.

In the cleaning frame according to the present application, the connecting component is a component that is easily corroded by the cleaning solution.

The cleaning frame according to the present application is made of metal.

The cleaning frame of the present application can keep the waste gas purification apparatus floating on the cleaning solution in a balanced fashion. At the same time as enabling the cleaning of a filtration component in the waste gas purification apparatus, the cleaning frame eliminates the operating step of manually removing the connecting component from the waste gas purification apparatus, so that the operating steps involved in cleaning the waste gas purification apparatus are simplified, and the time cost is low.

By considering the particular embodiments, drawings and claims below, other features, advantages and implementation examples of the present application can be expounded or become obvious. In addition, it should be understood that the abovementioned invention content and the following particular embodiments are all exemplary, and intended to provide further explanation without limiting the scope of the present application for which protection is claimed. However, the particular embodiments and particular real examples merely indicate preferred implementation examples of the present application. Various changes and amendments within the spirit and scope of the present application will become obvious to those skilled in the art through these particular embodiments.

BRIEF DESCRIPTION OF THE DRAWINGS

A better understanding of these and other features and advantages of the present application can be gained by reading the detailed description below with reference to the drawings, throughout which, identical reference labels indicate identical components, wherein.

DETAILED DESCRIPTION OF EMBODIMENTS

Figure 1A:
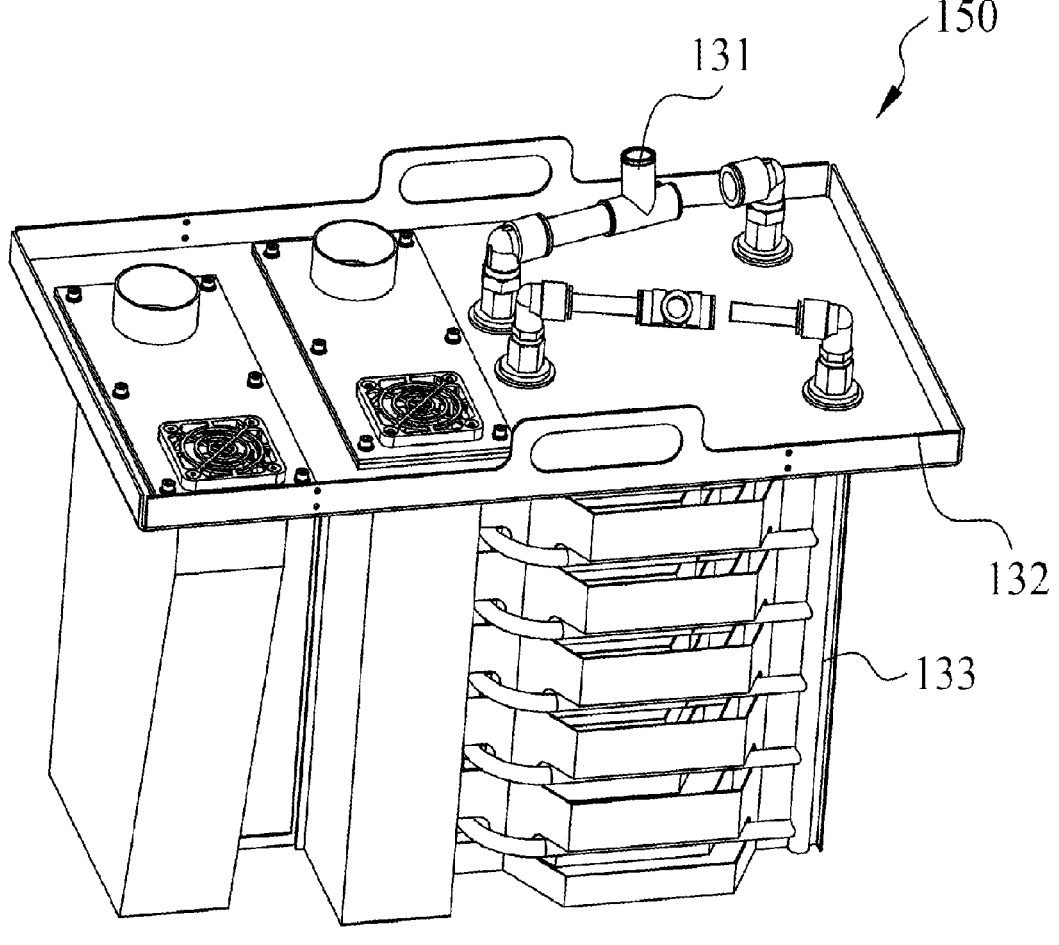
FIG. 1A is a three-dimensional drawing of a waste gas purification apparatus using the cleaning frame of the present application.

Various particular embodiments of the present application are described below with reference to the drawings, which form part of this specification. It should be understood that although terms indicating direction, such as "up", "down", "left" and "right" are used in the present application to describe various exemplary structural parts and elements of the present application in a directional or orientational way, these terms are used here solely to facilitate explanation, and determined on the basis of the exemplary orientations shown in the drawings. Since the embodiments disclosed in the present application may be arranged in different directions, these terms indicating direction are merely illustrative and should not be regarded as limiting. In the drawings below, identical reference labels are used for identical components.

FIG. 1A is a three-dimensional drawing of a waste gas purification apparatus 150 using a cleaning frame 100 (FIG. 1B) according to the present application, and is intended to show the specific structure of the waste gas purification apparatus 150. As shown in FIG. 1A, the waste gas purification apparatus 150 comprises an end plate 132, a connecting component 131 and a filtration component 133. The end plate 132 is substantially rectangular. The connecting component 131 and filtration component 133 are arranged and connected at two sides of the end plate 132. All outer edges of the filtration component 133 fall within the range of outer edges of the end plate 132. That is to say, all dimensions of an upper end of the filtration component 133 connected to the end plate 132, including a dimension in a length direction of the end plate 132 and a dimension in a width direction of the end plate 132, are smaller than dimensions of the end plate 132. In an example of the present invention, the filtration component 133 is located at a lower side (i.e., below) the end plate 132, while the connecting component 131 is located at an upper side (i.e., above) the end plate 132. In addition, the end plate 132 and filtration component 133 are made of metal or stainless steel, etc. The connecting component 131 is made of plastic or rubber, etc. The connecting component 131 is used for delivering waste gas from a reflow oven into the filtration component 133, in order to filter flux in the waste gas via the filtration component 133, such that flux is deposited and becomes attached in the filtration component 133. After being filtered by the filtration component 133, the waste gas will no longer contain any flux, and is subsequently discharged from the waste gas purification apparatus 150.

Figure 1B:
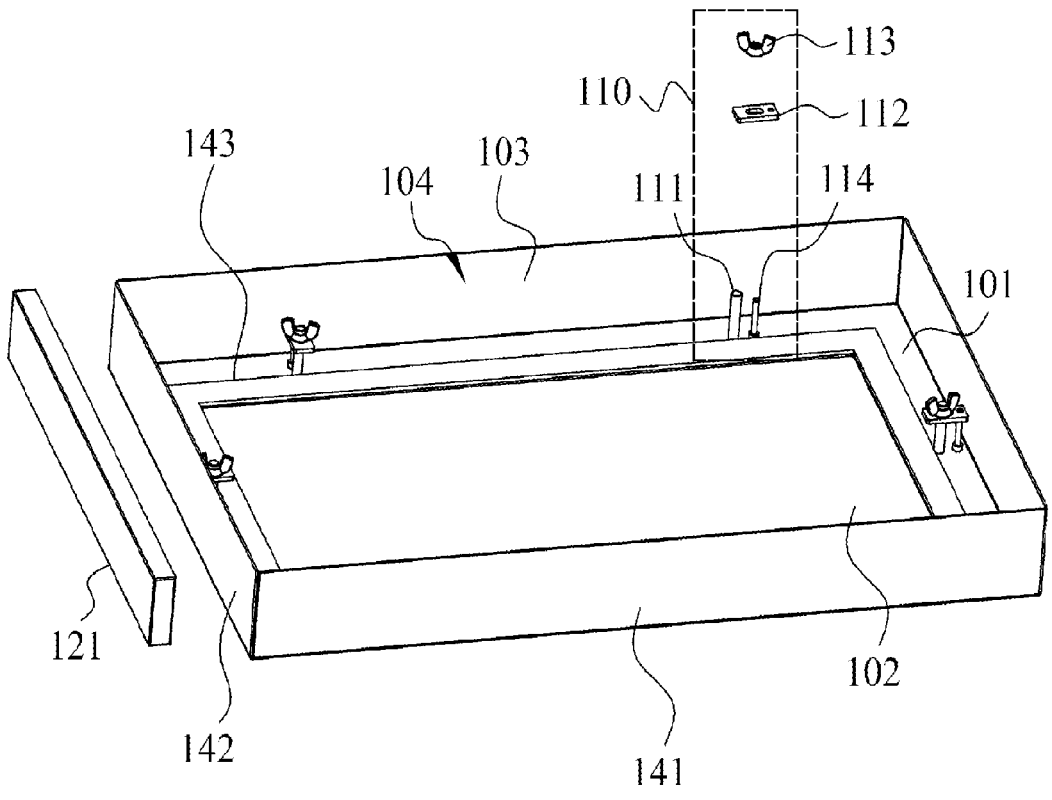
FIG. 1B is a partial exploded drawing of the cleaning frame in an embodiment of the present application.

FIG. 1B is a partial exploded drawing of the cleaning frame 100 in an embodiment of the present application. The cleaning frame 100 is used for keeping the waste gas purification apparatus 150 in a cleaning solution, such that the filtration component 133 of the waste gas purification apparatus 150 remains immersed in the cleaning solution, and such that the connecting component 131 will not come into contact with the cleaning solution.

As shown in FIG. 1B, the cleaning frame 100 comprises a bottom 101 and a sidewall 103. The bottom 101 is a rectangular plate, comprising a length direction, a width direction and a thickness direction. The bottom 101 is provided with a channel 102 running through it in the thickness direction. The sidewall 103 is formed by upward extension from the bottom 101 around the channel 102, and comprises a pair of length sidewalls 141 arranged opposite each other and a pair of width sidewalls 142 arranged opposite each other. The sidewall 103 is separated from an edge of the channel 102 by a certain distance, such that the bottom 101 has a retaining part 143 between the sidewall 103 and the channel 102. The sidewall 103 and the retaining part 143 of the bottom 101 enclose a holding cavity 104 having upper and lower openings. The channel 102 is also rectangular, having a length extending in the direction of the length sidewall 141 and a width extending in the direction of the width sidewall 142. The distances from the length sidewall 141 and the width sidewall 142 to the edge of the channel 102 are substantially the same, thus the retaining part 143 has uniform width around the channel 102.

The dimensions of the channel 102 are matched to the dimensions of the waste gas purification apparatus 150. Specifically, the dimensions of the channel 102 are smaller than the dimensions of the end plate 132 of the waste gas purification apparatus 150, so that the end plate 132 can be set up on the retaining part 143 and closes the channel 102. That is to say, the dimensions of the channel 102 are larger than the dimensions of the filtration component 133, and smaller than the dimensions of the end plate 132 of the waste gas purification apparatus 150. Consequently, the filtration component 133 of the waste gas purification apparatus 150 can pass downward through the channel 102 from above the bottom 101, but the end plate 132 of the waste gas purification apparatus 150 cannot pass through the channel 102 and is set up on the retaining part 143 of the bottom 101, and retained within the holding cavity 104. The height of the sidewall 103 is set such that when the end plate 132 is set up on the bottom 101, the top of the sidewall 103 is higher than the top of the waste gas purification apparatus 150.

As shown in FIG. 1B, the cleaning frame 100 further comprises six connecting means 110, for connecting the waste gas purification apparatus 150 to the cleaning frame 100. The six connecting means 110 are arranged on the bottom 101, around the channel 102 (as shown in FIG. 2B). Specifically, each of the connecting means 110 comprises a bolt 111, a clamping member 112, a nut 113 and a guide post 114. The bolt 111 and guide post 114 are arranged on the retaining part 143 of the bottom 101 substantially in a vertical direction, with lower ends of the bolt 111 and guide post 114 being connected to the bottom 101. The bolt 111 and guide post 114 are arranged at a certain distance from each other. A thread matched to the nut 113 is provided on the bolt 111, for connection to the nut 113. The guide post 114 is used to guide the movement of the clamping member 112. The clamping member 112 is provided with a bolt hole and a guide post hole, for receiving the bolt 111 and the guide post 114 respectively. The clamping member 112 is used for clamping the end plate 132 of the waste gas purification apparatus 150 to the retaining part 143 of the bottom 101. The nut 113 can mate with the bolt 111, so as to connect the waste gas purification apparatus 150 to the cleaning frame 100.

As shown in FIG. 1B, the cleaning frame 100 further comprises a counterweight 121, for causing the waste gas purification apparatus 150 to float on the surface of the cleaning solution in a balanced fashion. Specifically, in an example of the present application, because the waste gas purification apparatus 150 has more components at its right side, the center of gravity of the waste gas purification apparatus 150 is located at a position that is closer to the right. The counterweight 121 is connected to the width sidewall 142 at the left side, such that when the waste gas purification apparatus 150 and the cleaning frame 100 are connected together, the center of gravity of the waste gas purification apparatus 150 and cleaning frame 100 as a whole can be located substantially at the center thereof. As an example, the counterweight 121 is connected to the sidewall 103 by welding.

Figure 2A:
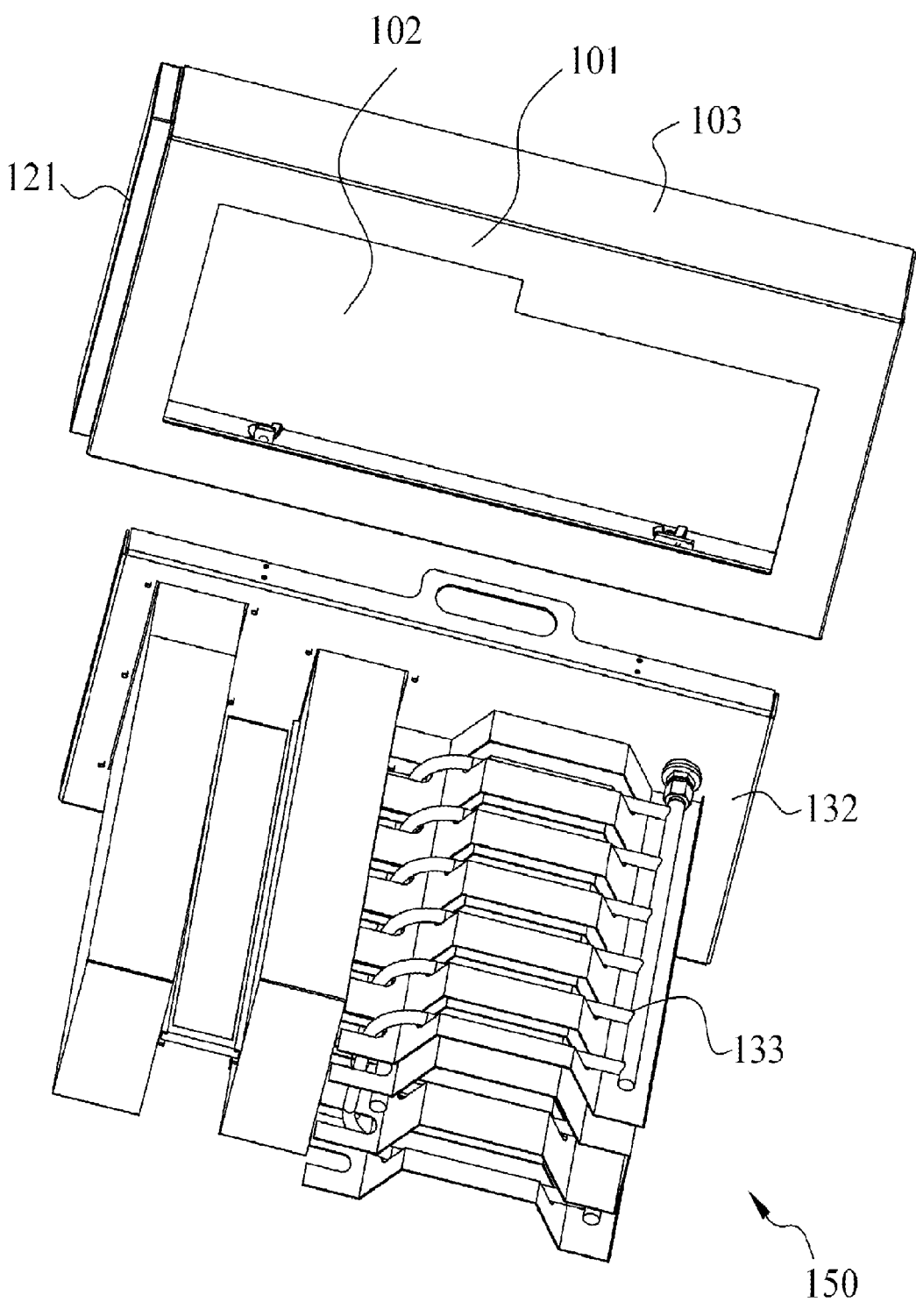
FIG. 2A is a three-dimensional drawing of the waste gas purification apparatus shown in FIG. 1A when not mounted on the cleaning frame shown in FIG. 1B, viewed from below.
Figure 2B:
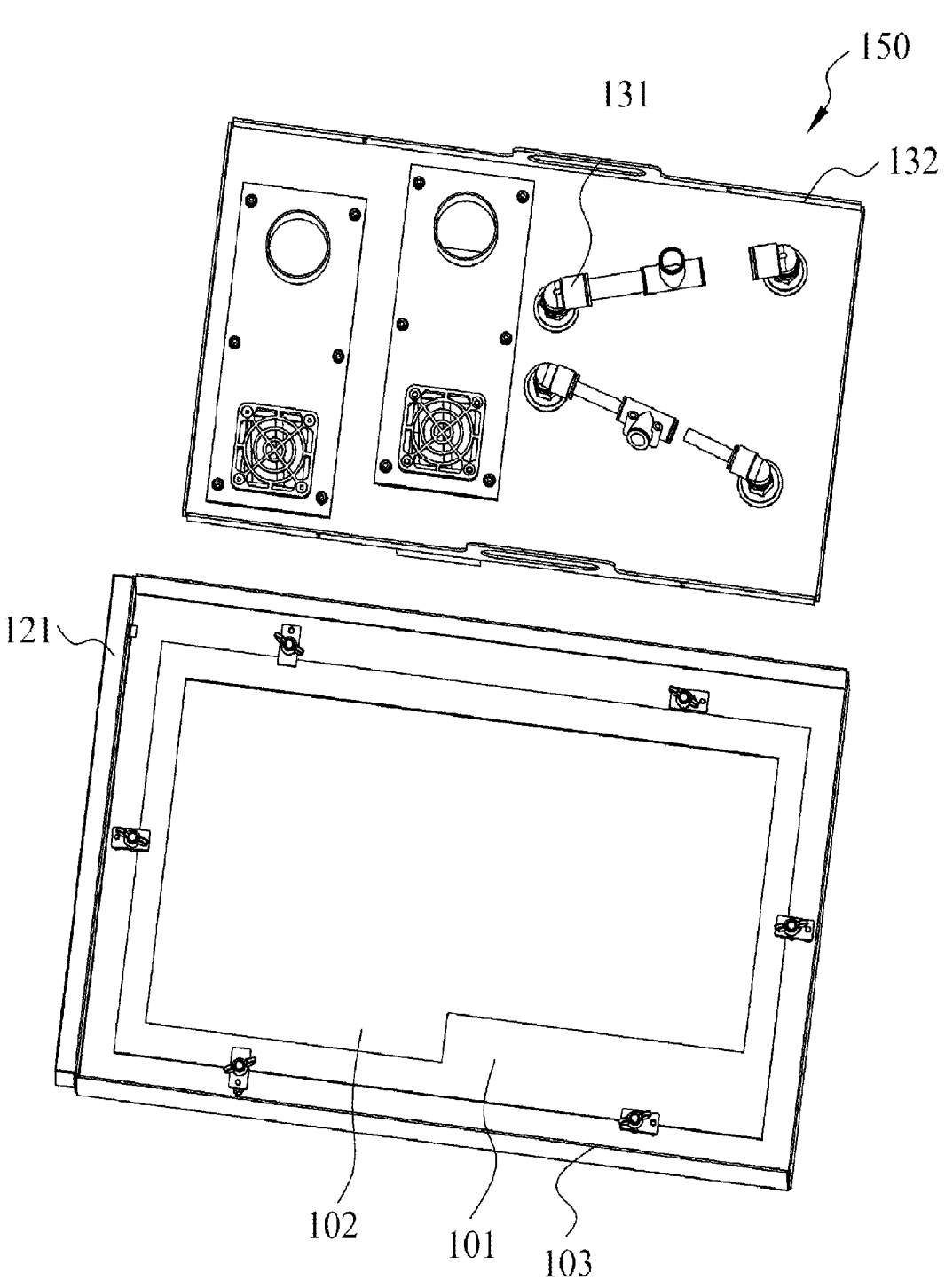
FIG. 2B is a three-dimensional drawing of the waste gas purification apparatus shown in FIG. 1A when not mounted on the cleaning frame shown in FIG. 1B, viewed from above.
Figure 2C:
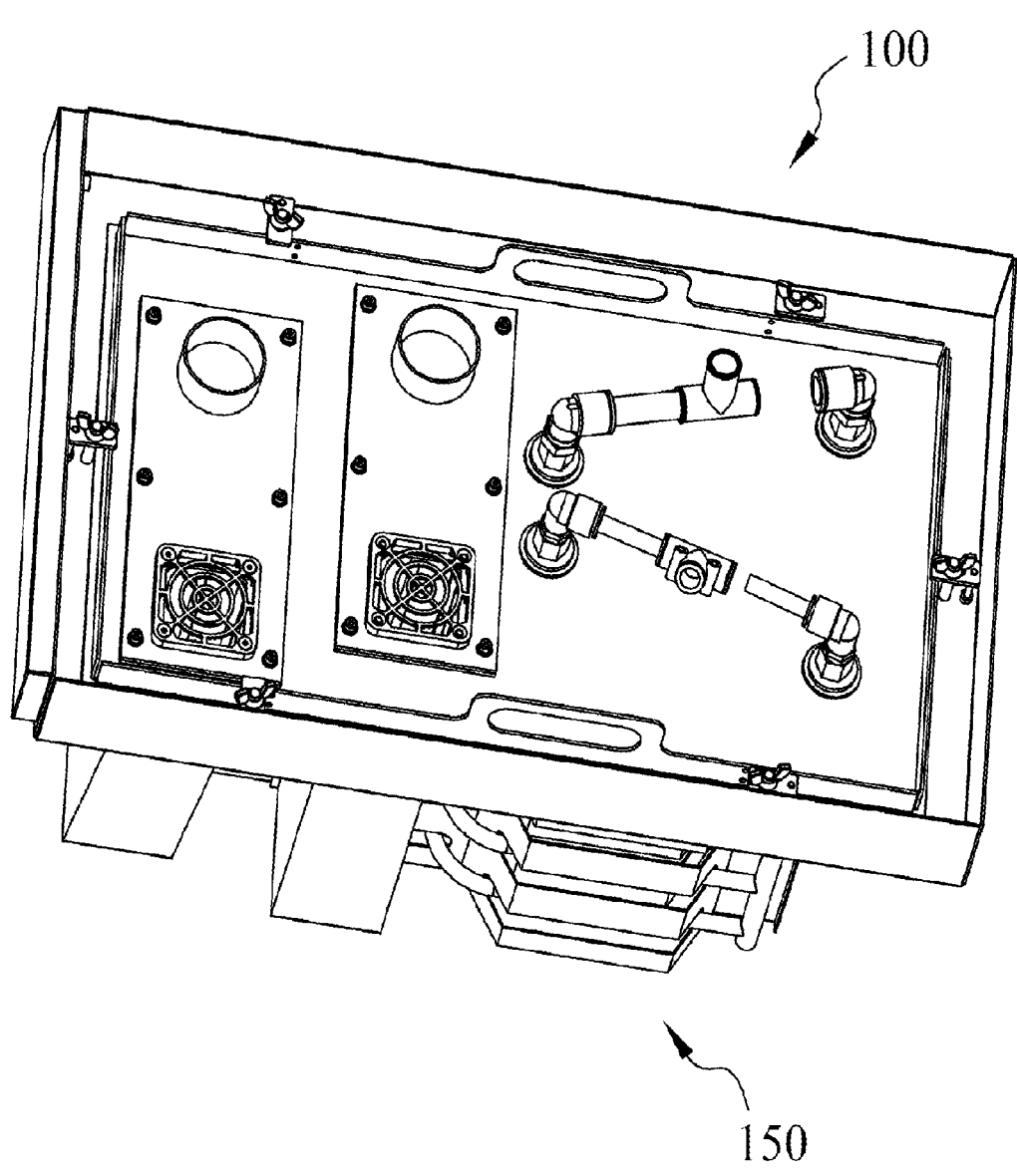
FIG. 2C is a three-dimensional drawing of the waste gas purification apparatus shown in FIG. 1A after being mounted on the cleaning frame shown in FIG. 1B, viewed from above.
Figure 2D:
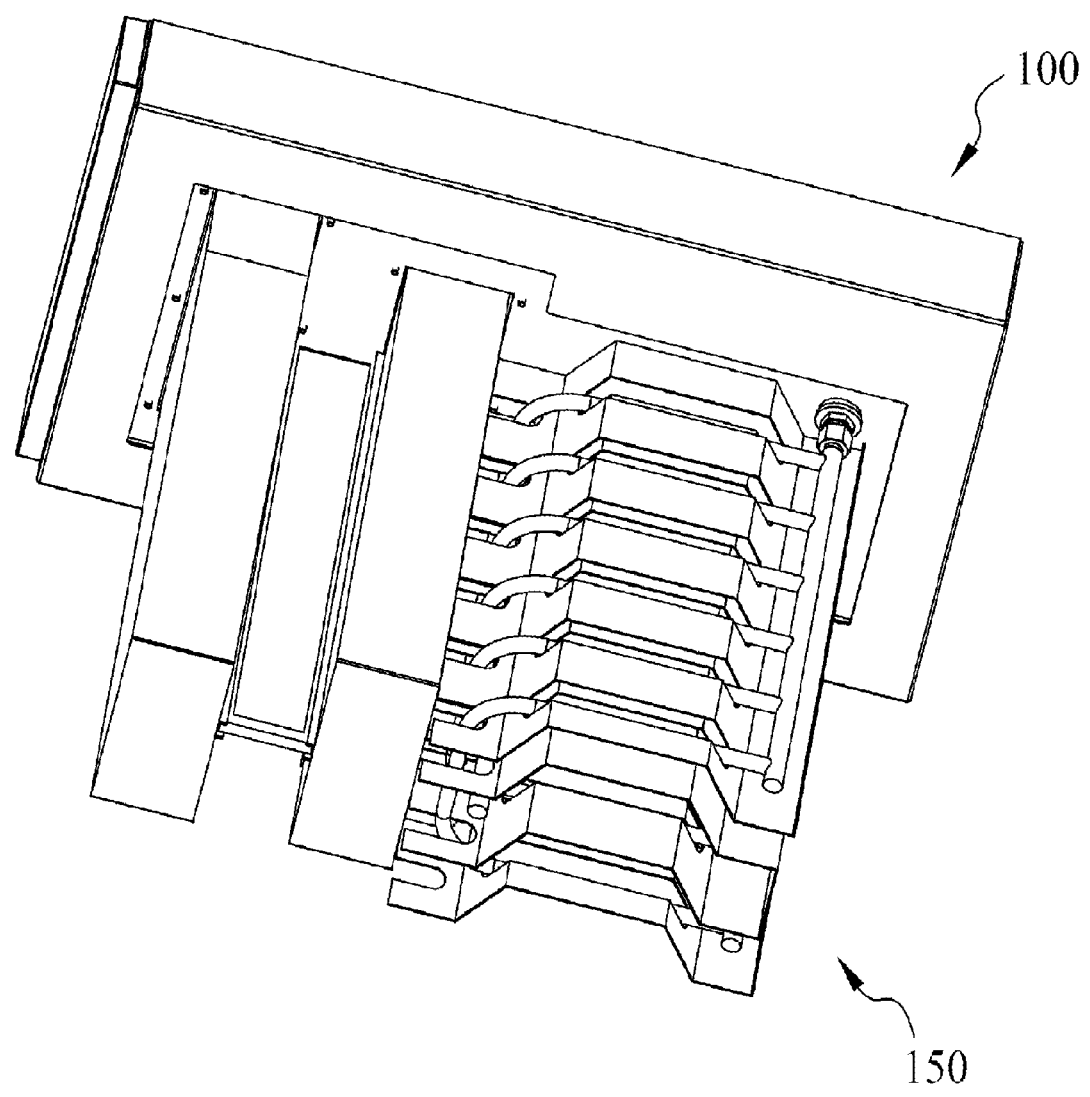
FIG. 2D is a three-dimensional drawing of the waste gas purification apparatus shown in FIG. 1A after being mounted on the cleaning frame shown in FIG. 1B, viewed from below.

FIG. 2A is a three-dimensional drawing of the cleaning frame 100 and waste gas purification apparatus 150 shown in FIG. 1 in a non-assembled state, viewed from below; FIG. 2B is a three-dimensional drawing of the cleaning frame 100 and waste gas purification apparatus 150 shown in FIG. 1 in a non-assembled state, viewed from above; FIG. 2C is a three-dimensional drawing of the cleaning frame 100 and waste gas purification apparatus 150 shown in FIG. 1 in an assembled state, viewed from above; and FIG. 2D is a three-dimensional drawing of the cleaning frame 100 and waste gas purification apparatus 150 shown in FIG. 1 in an assembled state, viewed from below, the intention being to show the mating relationship of the cleaning frame 100 and waste gas purification apparatus 150. In the course of operation, when the waste gas purification apparatus 150 needs to be cleaned, the operator will first of all place the waste gas purification apparatus 150 downward from above the channel 102 of the cleaning frame 100, until the end plate 132 of the waste gas purification apparatus 150 comes into contact with, and is set up on, the retaining part 143 of the bottom 101. The operator then aligns the bolt holes and guide post holes of the clamping members 112 with the bolts 111 and guide posts 114 respectively, and presses down until lower surfaces of the clamping members 112 abut an upper part of the end plate 132 of the waste gas purification apparatus 150, so as to clamp the end plate 132 between the retaining part 143 of the bottom 101 and the clamping members 112. The operator then turns the nuts 113 so that they move downward from the tops of the bolts 111, until the bolts 111 come into contact with the clamping members 112 and can no longer be turned. The waste gas purification apparatus 150 is thus connected to the cleaning frame 100. It must be noted that it is also possible for the connecting means to not comprise the clamping member 112; all that is required is for the nut 113 to be larger, so that it can clamp the end plate 132 to the retaining part 143 of the bottom 101 when installed in place.

Figure 3:
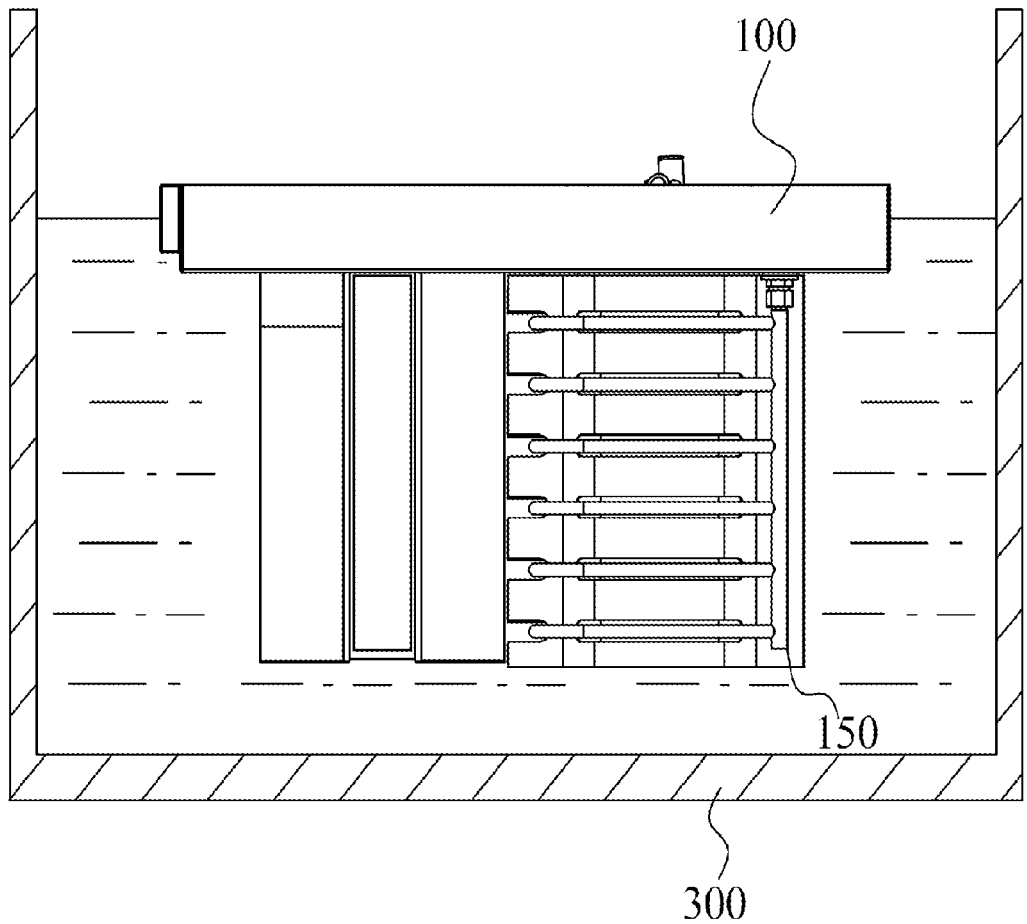
FIG. 3 is a schematic lateral drawing of the waste gas purification apparatus mounted on the cleaning frame as shown in FIGS. 2C and 2D, when in a cleaning state.

FIG. 3 is a schematic lateral drawing of the waste gas purification apparatus mounted on the cleaning frame as shown in FIGS. 2C and 2D, when in a cleaning state. As shown in FIG. 3, after being connected together, the waste gas purification apparatus 150 and cleaning frame 100 are placed in a cleaning tank 300 containing the cleaning solution, in order to clean the waste gas purification apparatus 150.

The cleaning frame 100 of the present application is configured such that: when the waste gas purification apparatus 150 and cleaning frame 100 are connected together, the cleaning frame 100 can keep the waste gas purification apparatus 150 in the cleaning solution, and the sidewall 103 can be at least partially located above the surface of the cleaning solution, so that the waste gas purification apparatus 150 and cleaning frame 100 float in the cleaning solution. Specifically, when the buoyancy experienced by the waste gas purification apparatus 150 and cleaning frame 100 that are connected together is equal to the weight thereof, the waste gas purification apparatus 150 and cleaning frame 100 that are connected together can float in the cleaning solution. The weight of the waste gas purification apparatus 150 and cleaning frame 100 that are connected together is: the sum of the mass of the waste gas purification apparatus 150 and the mass of the cleaning frame 100, multiplied by the acceleration due to gravity, g. The buoyancy experienced by the waste gas purification apparatus 150 and cleaning frame 100 that are connected together is: the volume of cleaning solution displaced by them, multiplied by the density of the cleaning solution, and then multiplied by the acceleration due to gravity, g. In an embodiment of the present application, the volume of cleaning solution displaced by the waste gas purification apparatus 150 and cleaning frame 100 is: the product of the area of the end plate 132 and the height of the sidewall 103 located below the cleaning solution, added to the volume of the filtration component 133 in the waste gas purification apparatus 150. In an embodiment of the present application, the weight of the waste gas purification apparatus 150 and cleaning frame 100 is 80 N. The density of the cleaning solution is 789 kg/m$^3$. The volume of the filtration component 133 in the waste gas purification apparatus 150 is 0.012 M3. The area of the end plate 132 is 0.018 M2. The height of the sidewall 103 located below the cleaning solution is 55 CM.

During a cleaning operation, flux in the filtration component 133 immersed in the cleaning solution can be dissolved by the cleaning solution, such that flux that has accumulated in the waste gas purification apparatus 150 is separated from the waste gas purification apparatus 150. An ultrasound device may also be arranged in the cleaning tank; wave motion can be produced in the cleaning solution by means of the ultrasound device, thereby speeding up the separation of flux from the waste gas purification apparatus 150.

The applicant has found that the cleaning solution is generally a strongly acidic or strongly alkaline solution, which is corrosive to the connecting component 131 made of plastic or rubber. In the prior art, when the waste gas purification apparatus 150 needs to be cleaned, it is necessary to first of all remove the connecting component 131 from the waste gas purification apparatus 150, and then place the waste gas purification apparatus 150 from which the connecting component 131 has been removed into the cleaning tank. Before the waste gas purification apparatus 150 is immersed in the cleaning solution, the operator is required to manually remove the connecting component 131 from the waste gas purification apparatus 150, and this operation makes the entire cleaning operation tedious, with high consumption of manpower.

The cleaning frame 100 of the present application is able to solve the abovementioned technical problem effectively. When the waste gas purification apparatus 150 needs to be cleaned, the operator first of all connects the waste gas purification apparatus 150 and the cleaning frame 100 together in the manner of operation described above. The waste gas purification apparatus 150 and cleaning frame 100 that are connected together are then placed together into the cleaning tank holding a sufficient depth of cleaning solution. Since the waste gas purification apparatus 150 and cleaning frame 100 that are connected together are able to float on the cleaning solution, the filtration component 133 located below the end plate 132 of the waste gas purification apparatus 150 can be completely immersed in the cleaning solution. The operator can then switch on the ultrasound device in the cleaning tank, in order to produce wave motion in the cleaning solution, thereby speeding up the separation of flux from the waste gas purification apparatus 150. Since the sidewall 103 encloses the bottom 101 to form the holding cavity 104 which has a certain height, the sidewall 103 can prevent the cleaning solution, which exhibits wave motion, from entering the holding cavity 104 over the sidewall 103 and corroding the connecting component 131 in the holding cavity 104. When cleaning of the waste gas purification apparatus 150 has ended, the operator can unscrew the nuts 113 and will then able to separate the waste gas purification apparatus 150 from the cleaning frame 100. The cleaned waste gas purification apparatus 150 can be re-mounted on the reflow oven directly. Thus, the cleaning frame 100 of the present application can avoid the operations, which are necessary in the prior art, of removing and installing the connecting component 131 before and after the waste gas purification apparatus 150 is cleaned, thereby avoiding possible damage to the connecting component 131 when the connecting component 131 is removed and installed. This can make the operating steps simple, with a low time cost. In addition, at the same time as enabling the cleaning of the filtration component 133 in the waste gas purification apparatus 150, the cleaning frame 100 of the present application avoids corrosion of the connecting component 131 due to contact between the connecting component 131 and the cleaning solution.

Those skilled in the art will understand that although the cleaning frame 100 in the present application comprises six connecting means 110, any number of connecting means 110 fall within the scope of protection of the present application.

Those skilled in the art will also understand that although the connecting means 110 of the cleaning frame 100 in the present application are arranged on the bottom 101, the connecting means 110 may also be arranged on the sidewall 103, for the purpose of connecting the cleaning frame 100 to the waste gas purification apparatus 150.

Those skilled in the art will also understand that although the connecting means 110 in the present application comprises the bolt 111, the clamping member 112, the nut 113 and the guide post 114, any form of connecting means (e.g. nut, bolt, snap-fit, etc.) falls within the scope of protection of the present application.

Those skilled in the art will also understand that although the counterweight 121 of the cleaning frame 100 in the present application is arranged at the left side, the position of the counterweight 121 may be configured according to the center of gravity of the waste gas purification apparatus 150, and may be set at any position on the bottom 101 or the sidewall 103.

Those skilled in the art will also understand that although the cleaning frame 100 in the present application comprises the counterweight 121, it may also not comprise the counterweight 121 as long as the cleaning frame 100 is able to keep the waste gas purification apparatus 150 floating on the surface of the cleaning solution in a balanced fashion.

Those skilled in the art will also understand that although the end plate 132 and filtration component 133 are made of metal or stainless steel, etc., the connecting component 131 is made of plastic or rubber, etc., and the cleaning solution is a strongly acidic or strongly alkaline solution in the present application, the only requirement is that the connecting component 131 be made of a material that is easily corroded by the cleaning solution, and the end plate 132 and filtration component 133 be made of a material that is not easily corroded by the cleaning solution.

Although only some features of the present application have been illustrated and described herein, those skilled in the art could make various improvements and changes. Thus, it should be understood that the attached claims are intended to cover all such improvements and changes that fall within the scope of the substance and spirit of the present application.

The invention claimed is:

1. A cleaning system configured to clean a waste gas purification apparatus including an end plate, a filtration component extending from the end plate on a first side of the end plate, and a connecting component supported on the end plate on a second side of the end plate, the second side of the end plate being opposite to the first side of the end plate, the cleaning system comprising:

a cleaning tank configured to hold a cleaning solution; and a cleaning frame configured to support the waste gas purification apparatus in the cleaning solution, the cleaning frame including a bottom including a channel running through the bottom, and a sidewall formed by upward extension from the bottom around the channel, the bottom having a retaining part between the sidewall and the channel, and the sidewall and the retaining part enclosing a holding cavity, wherein a dimension of the channel is smaller than a dimension of the end plate of the waste gas purification apparatus, the end plate of the waste gas purification apparatus being supported by the retaining part and configured to seal the channel such that the connecting component is located above the retaining part, and located within the holding cavity, and wherein the cleaning frame is configured to maintain the waste gas purification apparatus in a floating position in the cleaning solution with the sidewall of the cleaning frame can at least partially float above the surface of the cleaning solution to maintain the filtration component in the cleaning solution of the cleaning tank and to isolate the connecting component of the waste gas purification apparatus from the cleaning solution.

2. The cleaning system set forth in claim 1, wherein the height of the sidewall is set such that when the end plate of the waste gas purification apparatus is set up on the bottom, the top of the sidewall is higher than the top of the waste gas purification apparatus.

3. The cleaning system set forth in claim 1, wherein the cleaning frame further includes a counterweight connected to the sidewall to keep the waste gas purification apparatus on the surface of the cleaning solution in a balanced fashion.

4. The cleaning system set forth in claim 3, wherein the position of the counterweight is set according to the center of gravity of the waste gas purification apparatus.

5. The cleaning system set forth in claim 3, wherein the counterweight is connected to the sidewall by welding.

6. The cleaning system set forth in claim 1, wherein the cleaning frame further includes at least two connecting means, the at least two connecting means being arranged on the cleaning frame to connect the waste gas purification apparatus to the cleaning frame.

7. The cleaning system set forth in claim 6, wherein the at least two connecting means are arranged on the bottom, around the channel.

8. The cleaning system set forth in claim 6, wherein each of the at least two connecting means includes a bolt connected to the bottom, a clamping member having a bolt hole through which the bolt can pass, the clamping member being configured to abut the waste gas purification apparatus, and a nut configured to mate with the bolt to connect the waste gas purification apparatus to the cleaning frame.

9. The cleaning system set forth in claim 1, wherein the connecting component is a component that is easily corroded by the cleaning solution.

10. The cleaning system set forth in claim 1, wherein the cleaning frame is made of metal.

* * * * *